United States Patent
Milne et al.

(10) Patent No.: US 7,306,041 B2
(45) Date of Patent: Dec. 11, 2007

(54) METHOD FOR TREATING A SUBTERRANEAN FORMATION

(75) Inventors: Arthur Milne, El Bosque (EC); Diego Soler, Conjunto Arboreto (CO)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/279,207

(22) Filed: Apr. 10, 2006

(65) Prior Publication Data

US 2007/0235189 A1  Oct. 11, 2007

(51) Int. Cl.
*E21B 43/26* (2006.01)

(52) U.S. Cl. .................... 166/308.2; 166/307; 166/263

(58) Field of Classification Search .................... None
See application file for complete search history.

(56) References Cited

U.S. PATENT DOCUMENTS

| | | | |
|---|---|---|---|
| 2,300,393 A | 11/1942 | Ayers, Jr. | |
| 4,090,563 A | 5/1978 | Lybarger et al. | |
| 4,160,483 A | 7/1979 | Thomas et al. | |
| 4,703,803 A | 11/1987 | Blumer | |
| 5,282,995 A | 2/1994 | Paul et al. | |
| 6,435,277 B1 * | 8/2002 | Qu et al. | 166/281 |
| 6,806,236 B2 | 10/2004 | Frenier et al. | |
| 6,924,255 B2 | 8/2005 | Chang et al. | |
| 7,114,567 B2 | 10/2006 | Chan | |
| 7,165,613 B2 * | 1/2007 | Chan et al. | 166/280.1 |
| 2004/0009882 A1 | 1/2004 | Fu | |
| 2004/0138071 A1 * | 7/2004 | Gupta et al. | 507/200 |
| 2004/0254079 A1 | 12/2004 | Frenier et al. | |
| 2005/0113263 A1 | 5/2005 | Brown et al. | |
| 2005/0176604 A1 | 8/2005 | Lee et al. | |
| 2007/0102155 A1 | 5/2007 | Chan | |

* cited by examiner

*Primary Examiner*—Jennifer H. Gay
*Assistant Examiner*—Kerry W. Leonard
(74) *Attorney, Agent, or Firm*—David Cate; Darla Fonseca; Robin Nava

(57) ABSTRACT

Disclosed are acid fracturing methods for subterranean siliceous formations employing a viscous dissolving fluid to create a permeable conduit that bypasses the near wellbore damage. The viscous dissolving fluids used according to the invention are acid-fracturing treatment fluids containing a dissolving agent viscosified with a material such as a viscoelastic surfactant, and the fluid is injected into a sandstone formation at a pressure sufficient to create a hydraulic fracture. Also, the viscous dissolving fluid leaks off into the faces of the fracture thus "stimulating" the formation. Hence when the hydraulic fracture has closed there is a part of the formation that has been effectively stimulated, creating a pathway for fluids to preferentially flow to the wellbore. The formation may then be flowed back to produce a substantial volume of the treatment fluid.

20 Claims, 1 Drawing Sheet

METHOD FOR TREATING A
SUBTERRANEAN FORMATION

TECHNICAL FIELD OF THE INVENTION

This invention relates to improving the production of fluids from wells penetrating subterranean formations. More particularly, the invention relates to acid fracturing methods as applied in subterranean formations comprising siliceous material.

BACKGROUND OF THE INVENTION

The flow of fluids through porous media, for example the production of fluids from wells, may be governed by three principle factors, namely the size of the flow path, the permeability of the flow path, and the driving force.

It is often necessary to stimulate the production of fluids from a subterranean formation when a well is not producing satisfactorily. The failure to produce is typically due to an inadequate, or a damaged, path for fluids to flow from the formation to the wellbore. This may be because the formation inherently has insufficient porosity and/or permeability or because the porosity and/or permeability have been decreased (damaged) near the wellbore during drilling and/or completion and/or production.

In sandstone reservoirs, production is often limited by either naturally occurring or induced damage that partially plug the pore spaces in the formation matrix near to the wellbore and hence reduce the effective permeability (flow capacity) of the formation. In such cases a stimulation treatment is performed by either injecting acid/chemicals to remove the damage in the formation, at pressures which do not exceed the fracture gradient of the formation (matrix stimulation), or bypassing the damage by propped fracturing treatment.

Fracturing is a treatment commonly used to stimulate production. In fracturing, a fluid is forced into the formation at a pressure above that at which the formation rock will part, to create an enlarged flow path. However, when the pressure is released, the fracture typically closes and the new flow path is not maintained unless the operator provides some mechanism by which the fracture is held open. There are two common ways of doing this. In conventional propped hydraulic fracturing, the fluid that is used to generate or propagate the fracture is viscous and carries a solid proppant that is trapped in the fracture when the pressure is released, preventing the fracture from closing. In acid fracturing, also known as fracture acidizing, the fracture is generated and subsequently treated with an acid.

The applications of fracturing treatments are limited by the ability to keep the fracture from propagating out of the reservoir and/or establishing communication with intervals containing or in contact with water. The success of matrix stimulation treatments is often limited by the compatibility of the treating acid/chemicals with the reservoir fluids, the volumes and types of specific chemicals required to fill the pore space, the limited contact between the treating chemicals and the damage in the pore spaces, as well as the associated time and cost.

Accordingly, there is a need for sandstone acid fracturing treatments to overcome the current limitations of both conventional matrix and propped fracturing treatments. By using a viscous dissolving fluid to create a permeable conduit that bypasses the near wellbore damage, without the need to use proppant.

SUMMARY OF THE INVENTION

Disclosed herein are acid fracturing methods for subterranean siliceous formations using viscous dissolving fluids containing a silicate dissolving agent, where the viscous fluid creates a fracture in the formation. The methods of the invention create permeable conduits that bypass near wellbore damage. Particularly, the invention relates to methods of fracturing and acidizing a subterranean sandstone formation penetrated by a wellbore, the method including preparing a viscous dissolving fluid at a pH appropriate for treating the formation, injecting the treatment fluid into the formation at a pressure that exceeds the fracture initiation pressure of the formation, where the viscous dissolving fluid leaks off into the faces of the fracture to stimulate the formation. The initiation pressure is then relieved thus allowing the hydraulic fracture to close. The formation may then be flowed back to produce a substantial volume of the treatment fluid.

Viscous dissolving fluids used according to the invention are acid-fracturing treatments fluids contain a dissolving agent such as fluoric acid, source of fluoric acid, mixture of hydrochloric acid and fluoric acid, mixture of sources of fluoric acid and hydrochloric acid, chelant, organic acid, etc. or combination thereof. The dissolving agent is viscosified with a material such as a viscoelastic surfactant, and injected into a sandstone formation to create a hydraulic fracture. The viscous dissolving fluid leaks off into the faces of the fracture "stimulating" the formation. Hence when the hydraulic fracture has closed there is a part of the formation that has been effectively stimulated, creating a pathway for fluids to preferentially flow to the wellbore.

Methods of the invention are particularly useful for sandstone formations, and are particularly applicable in higher permeability formations that have a significant percentage of "acid" soluble minerals in the matrix. Also, the methods may be useful where permeability has been reduced near the wellbore due to partial plugging of the pore spaces. Generally, the higher the percentage of acid soluble minerals, the more effective will be the treatment.

BRIEF DESCRIPTION OF THE DRAWINGS

The invention may be understood by reference to the following description taken in conjunction with the accompanying drawings, in which.

DETAILED DESCRIPTION

The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components others than the ones already cited. In the summary of the invention and this detailed description, each numerical value should be read once as modified by the term "about" (unless already expressly so modified), and then read again as not so modified unless otherwise indicated in context.

The principles and the methods described below apply to any sandstone, and related, mineral types, although they will be discussed in terms of sandstone. Formations that are considered to be sandstone may contain some carbonates. Also, when we are describing situations in which the acid reacts with the first material with which it comes into contact, we will describe the location of that reaction as "near the wellbore" although, of course, there can be situations in which the location where the majority of the acid first comes into contact with the formation is farther away, for example when there are natural very high-conductivity streaks, or fractures or vugs. In this situation, "near the wellbore" should be interpreted as meaning primarily in the localized area most readily accessible to the acid.

The invention relates to acid fracturing methods as applied in subterranean formations comprising siliceous material, by pumping a viscosified fluid including a silicate dissolving agent to create a permeable conduit that bypasses the near wellbore damage. Particularly, the invention is methods of treating subterranean sandstone formations penetrated by a wellbore including: preparing an aqueous viscous dissolving fluid containing a viscosifier, and a dissolving agent, the fluid at a pH appropriate for treating the formation; injecting into the formation via the wellbore the treatment fluid at a pressure that exceeds the fracture initiation pressure of the formation, wherein the viscous dissolving fluid leaks off into the faces of the fracture to stimulate (dissolve acid soluble minerals present in the pore spaces) the formation; relieving the initiation pressure thus allowing a hydraulic fracture close; and flowing back the formation to produce a substantial volume of the treatment fluid. Hence the viscous dissolving fluid may both function as a fracturing and acidizing fluid. Inventors have discovered that this approach overcomes, at least in part, limitations of both conventional matrix and propped fracturing treatments.

Figure 1:
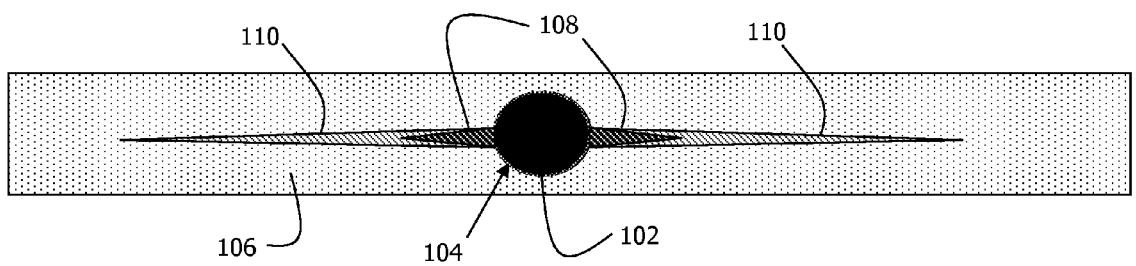
FIG. 1 shows a schematic of a conventional fracture.
Figure 2:
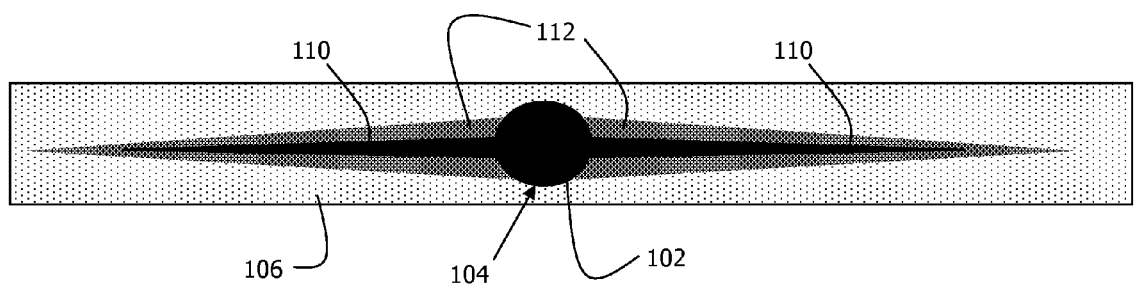
FIG. 2 and FIG. 3 represent a fracture having primary and secondary wormholes.
Figure 3:
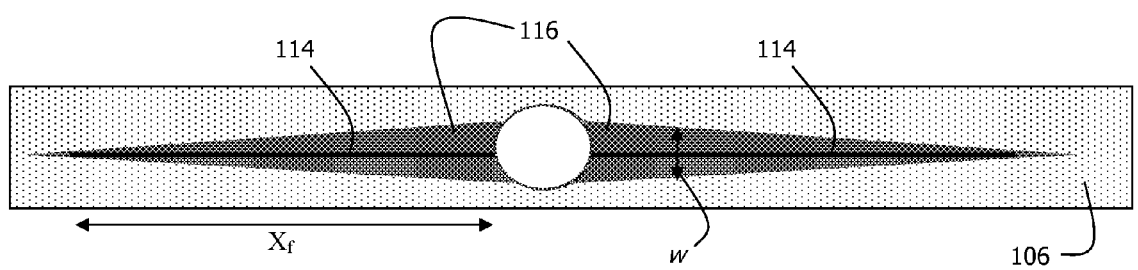

While the invention is not bound by any particular mechanism or theories of operation, a concept which may describe the function of the invention follows. Referring to FIG. 1 (a top cross-sectional view of a formation penetrated by a wellbore), viscosified fluid 102 is injected into wellbore 104 which penetrates formation 106 with permeability k. The fluid 102 is injected at a pressure that exceeds the fracture gradient of the formation 106, hydraulically creating a fracture 108 which may propagate under pressure to 110. Referring now to FIG. 2, viscosified fluid 102 is further injected into wellbore 104 and begins to leakoff 112 through the fracture faces into the formation matrix 106 during and subsequent to fracture propagation 110, fracture propagation resulting in fracture length Xf. Now referring to FIG. 3, upon cessation of pumping, the hydraulic fracture 114 will subsequently partially or fully close, leaving a "shadow" of acidized formation 116 with width w and permeability kf. The change in the flow capacity of the stimulated formation can be expressed in terms of dimensionless fracture conductivity:

$$CfD = \frac{kf \times w}{k \times Xf}$$

Hence, in one example illustrating the possible mechanism, formation 106 has pre-stimulation permeability k=17 md, acidized formation 116 has permeability kf=68 md with width w=12 inches, fracture length Xf=50 ft, change in flow capacity CfD may be calculated:

$$CfD = \frac{kf \times w}{k \times Xf} = \frac{68 \times 12}{17 \times 50} = 0.34$$

Fluids used according to the invention are single acid-fracturing treatments fluids containing a dissolving agent such as, but not necessarily limited to, fluoric acid (HF), source of HF, mixture of hydrochloric acid and fluoric acid, mixture of source of HF and hydrochloric acid, chelant, organic acid, etc. or combination thereof) which is viscosified and injected into sandstone to create a hydraulic fracture. During the time that the fluid is being pumped and after pumping while the fracture closes the viscous dissolving fluid leaks off into the faces of the fracture "stimulating" (dissolving acid soluble minerals present in the pore spaces) the formation. Hence when the hydraulic fracture has closed there is a part of the formation (extending away from the wellbore) that has been effectively stimulated, creating a pathway for fluids to preferentially flow to the wellbore.

Further, some embodiments of the invention do not require need to use proppant as part of a fracturing treatment. However a proppant placement treatment may be conducted simultaneous with or subsequent to the acid-fracturing treatment. Also, In the case of wells perforated at 0 degree phasing or orientated 180 degree phasing, methods of the invention may be useful for placing scale and/or organic deposit inhibitors into a formation. In the case of formations with varying water saturation a shut down can be included in the pump schedule which would result in the viscoelastic surfactant acting to prevent the treating fluid from stimulating the intervals in which there is high water saturation.

Methods of the invention may be useful for any sandstone formation, and are particularly applicable in higher permeability formations (>about 10 md) that have a significant percentage (>about 5%) of "acid" soluble minerals in the matrix, and which the permeability has been reduced near the wellbore due to partial plugging of the pore spaces. Generally, the percentage of acid soluble minerals, the more effective will be the treatment. Also, the volume of fluid injected may vary from less than about 1000 gallons to more than about 10,000 gallons, while the length of the hydraulic fracture may vary from as little as about 10 ft to more than about 100 ft. Also, the depth of stimulation (fracture length) may be limited by rapid consumption (compact dissolution) of acid near the wellbore and by loss of acid through the fracture faces (commonly referred to as fluid leakoff or fluid loss).

The fluids used in the invention may be of any suitable viscosity. In some embodiments, the fluids may have measured viscosity values according to the following tables:

| | Viscosity (mPa-s) @ 100 sec$^{-1}$ | | |
| --- | --- | --- | --- |
| Temperature ° F. | Low | Typical | High |
| 80 | 180 | 260 | 300 |
| 160 | 80 | 150 | 200 |
| 240 | 100 | 150 | 200 |
| 300 | 20 | 30 | 50 |

| Temperature ° F. | Viscosity (mPa-s) @ 40 sec$^{-1}$ | | |
|---|---|---|---|
| | Low | Typical | High |
| 80 | 250 | 450 | 500 |
| 160 | 250 | 350 | 450 |
| 240 | 200 | 280 | 400 |
| 300 | 20 | 40 | 60 |

In some preferred embodiments, the fluids have a viscosifier incorporated in an amount suitable to provide measured fluid viscosity from about 20 mPa-s to about 400 mPa-s at a shear rate of 100 s$^{-1}$ over a temperature range from about 80° F. to about 300° F., more preferably the measured fluid viscosity is from about 40 mPa-s to about 400 mPa-s at a shear rate of 100 s$^{-1}$ over a temperature range from about 80° F. to about 300° F.

A gas component may optionally be incorporated into the fluids used in method embodiments of the invention. The gas component of the fluids of the present invention may be produced from any suitable gas that forms an energized fluid or foam when introduced into the aqueous medium. See, for example, U.S. Pat. No. 3,937,283 (Blauer et al.) hereinafter incorporated by reference. Preferably, the gas component comprises a gas selected from the group consisting of nitrogen, air, argon, carbon dioxide, and any mixtures thereof. More preferably the gas component comprises carbon dioxide, in any quality readily available. The gas component may assist in the fracturing and acidizing operation, as well as the well clean-up process. The fluid may contain from about 10% to about 90% volume gas component based upon total fluid volume percent, preferably from about 30% to about 80% volume gas component based upon total fluid volume percent, and more preferably from about 40% to about 70% volume gas component based upon total fluid volume percent.

Although we have used and will continue to use the terms acidizing and acid fracturing because they are so ingrained in the industry, instead of the term "acid" we will often use the terms "formation dissolving fluid", "viscous dissolving fluid" or "dissolving agent" because acids are not the only reactive fluids that will dissolve formation minerals. In addition to gelled acids, which use either inorganic or organic acids, or mixtures of these conventional acids, or even unconventional reactive fluids which use mainly chelant systems, which have been developed and have been shown to acidize sandstone reservoir formations when the overall process of stimulation is optimized. Examples of unconventional formation-dissolving fluids include aminopolycarboxylic acids and their salts, which are sometimes called "non-acid reactive solutions" or NARS when they are basic. In addition, novel acid systems, that are viscoelastic surfactant systems that may change viscosity dramatically as a function of pH, are also available for this application that could enhance more generation of wormholes from the fracture surface.

The reactivity of the formation-dissolving fluid may be selected (for example with the use of fracture and/or acidizing simulator computer programs) on the basis of the flow rate and formation and fluid parameters. The reactivity of the formation-dissolving fluid can be controlled by varying the rate of reaction, the rate of mass transfer, or both. For example, the rate of reaction can be decreased by changing the type of formation-dissolving fluid, by changing the form of the fluid from a solution to an emulsion, by adding appropriate salts (which change the equilibrium constant for the surface reaction), or by increasing the pH of the formation-dissolving fluid. The rate of reaction can also be decreased by changing the physical processing conditions (e.g., by reducing the pump flow rate and/or pumping pressure, or by cooling the formation-dissolving fluid using external cooling means or internal cooling means (e.g., pumping a large pad stage, or by adding nitrogen or other gas that is inert in the process).

In general, in creating fractures having acidized fracture faces, simple mineral acids such as, for example, fluoric acid (HF), any source of HF, fluoboric acid, mixtures of hydrochloric acid and fluoric acid, mixtures of source of HF and hydrochloric acid, or combination thereof, may be used as the formation dissolving agent in the viscosified single treatment fluid. The dissolving agent is present in an amount between about 0.2% and about 10% by weight based upon total weight of treatment fluid, preferably between about 1% and about 6% by weight based upon total weight of treatment fluid, more preferably between about 1% and about 3% by weight based upon total weight of treatment fluid.

The pH of the fluids employed in the invention may be varied widely. Accordingly, pH may be up to about 7. In some embodiments, the pH is about 5 or less, preferably 3 or less, more preferably about 1 or less.

To overcome the problem of reaction products (from the reaction of the formation dissolving agent with the minerals in the formation matrix) precipitating in the pores, which could result in a decrease in formation permeability after acid-fracturing, further incorporated into the fluid may be: organic acids, such as by non-limiting example, formic acid, acetic acid, lactic acid, glycolic acid, sulfamic acid, malic acid, citric acid, tartaric acid, maleic acid, methylsulfamic acid, chloroacetic acid, whose reactivities could be further adjusted by including varying amounts of sodium acetate or sodium formate respectively; chelating agents such as aminopolycarboxylic acids (such as ethylenediaminetetraacetic acid or hydroxyethylethylenediaminetriacetic acid (HEDTA), whose reactivities could be further adjusted by converting them partially or completely into sodium, potassium or ammonium salts or by adjusting the pH with, for example HCl); or retarded mineral acids (such as gelled or emulsified HCl, whose reactivity could be further adjusted by manipulation of the choice of and concentration of surfactant and of the oil/water ratio).

The chelating agents useful herein are a known class of materials having many members. The class of chelating agents includes, for example but not necessarily limited to, aminopolycarboxylic acids and phosphonic acids and sodium, potassium and ammonium salts thereof. HEDTA and HEIDA (hydroxyethyliminodiacetic acid) are useful in the present process; the free acids and their Na, K, NH$_4^+$ salts (and Ca salts) are soluble in strong acid as well as at high pH, so they may be more readily used at any pH and in combination with any other reactive fluids (e.g., HCl). Other aminopolycarboxylic acid members, including EDTA, NTA (nitrilotriacetic acid), DTPA (diethylenetriaminepentaacetic acid), and CDTA (cyclohexylenediaminetetraacetic acid) are also suitable. At low pH these latter acids and their salts may be less soluble. Examples of suitable phosphonic acids and their salts, include ATMP: aminotri(methylenephosphonic acid); HEDP: 1-hydroxyethylidene-1,1-phosphonic acid; HDTMPA: hexamethylenediaminetetra(methylenephosphonic acid); DTPMPA: diethylenediaminepentamethylenephosphonic acid; and 2-phosphonobutane-1,2,4-tricarboxylic acid. All these phosphonic acids are available from Solutia, Inc., St. Louis, Mo., USA, as DEQUEST (Registered Trademark of Solutia) phosphonates. Such materials are known in the oilfield. Particularly preferred chelant-based dissolvers are those containing hydroxyethylaminocarboxylic acids such as hydroxyethylethylenediaminetriacetic acid (HEDTA), hydroxyethyliminodiacetic acid (HEIDA), or a mixture thereof, as described in U.S. Pat. No. 6,436,880, which has a common assignee as the present application, and which is hereby incorporated in its entirety.

When present, the chelating agents, retarded mineral acids, or organic acids are present in an amount between about 1% and about 40% by weight based upon total weight of treatment fluid, preferably between about 5% and about 30% by weight based upon total weight of treatment fluid, more preferably between about 10% and about 20% by weight based upon total weight of treatment fluid.

In some methods practiced at higher temperatures, the fluids may use a chelating agent(s) as the formation dissolver. Particularly preferred examples are chelant-based dissolvers containing hydroxyethylaminocarboxylic acids such as hydroxyethylethylenediaminetriacetic acid (HEDTA), hydroxyethyliminodiacetic acid (HEIDA), or a mixture thereof, as mentioned above. These materials have low reactivity, low viscosity, but high dissolving capacity. Previously available formation-dissolving fluids were strong acids, retarded acids, or organic acids, but these are often ineffective at high formation temperatures. Organic acids are not suitable because they are far more expensive than mineral acids, and, while they have a lower reaction rate, they also have a much lower reactivity—in fact, they do not react to completion, but rather equilibrium with the formation rock is established. Hence one mole of HCl yields one mole of available acid (i.e., H$^+$), but one mole of acetic acid yields substantially less than one mole of available acid. However, because the described chelant-based materials have low reactivity at high temperature, low viscosity, but high dissolving capacity, they can be injected into propped fractures at the rates required to acidize without propagating fractures or displacing proppant.

As described above, the fluid may contain hydrogen fluoride, which may be actually hydrogen fluoride added to the fluid, or HF provided from a source. Examples of HF sources include ammonium fluoride and/or ammonium bifluoride or mixtures of the two. When strong acid is present the HF source may also be one or more of polyvinylammonium fluoride, polyvinylpyridinium fluoride, pyridinium fluoride, imidazolium fluoride, sodium tetrafluoroborate, ammonium tetrafluoroborate, salts of hexafluoroantimony, TEFLON™ synthetic resinous fluorine-containing polymer, and mixtures. The hydrogen fluoride source is present in an amount from between about 0.1% and about 6% by weight based upon total weight of treatment fluid, preferably between about 0.5% and about 6% by weight based upon total weight of treatment fluid, more preferably between about 1% and about 5% by weight based upon total weight of treatment fluid, and most preferably between about 1% and about 2% by weight based upon total weight of treatment fluid.

The sequence of blending the components of the aqueous acidic mixture of the invention is not critical, i.e., the components or aqueous solutions thereof may be blended in any desired order or sequence. Preferably, however, in the embodiments of the invention where a boron source is to be blended in the aqueous liquid, and where the boron source is of limited solubility, the acid, etc. chelant for aluminum and aluminum fluoride species and the fluoride ion source, or HF, are blended first with the aqueous liquid, followed by the blending or addition of the boron source. For example, the desired amounts of citric acid or N-(2-hydroxyethyl) ethylenediaminetriacetic acid (HEDTA) and ammonium bifluoride may be mixed with fresh water in a mixing vessel until dissolved. Thereafter, a boron source, such as boric acid, may be added to the vessel. The boric acid is preferably added last since it does not easily dissolve in fresh water, but will readily be taken up by the acid-containing solution. Although the compositions may be blended offsite, they will normally be blended at the surface proximate the well site, or on the fly, and pumped down well to the site selected for treatment, which may be isolated by suitable means as is known in the art. Alternatively, they may be blended as concentrates, and then diluted at the well site, either on the surface, or on the fly. Compositions or solutions used according to the invention may be used at temperatures ranging from about 40° F. to about 300° F.

As will be understood by those skilled in the art, blending of the components or compounds specified herein in aqueous liquid gives rise to chemical reactions in the aqueous liquid, to the effect that, in each embodiment, a complex mixture of ionic species is produced in the aqueous liquid. Exemplary formulation reaction equations, which, in the case of equation (1), illustrates the equilibrium reaction for hydrolysis of fluoboric acid, are shown, as follows:

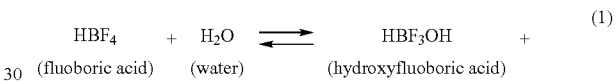

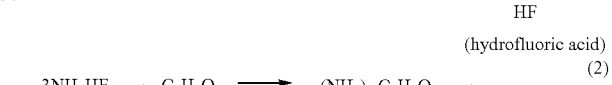

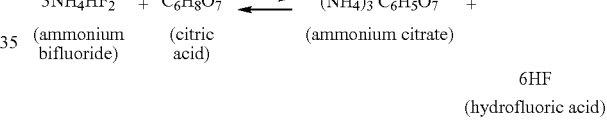

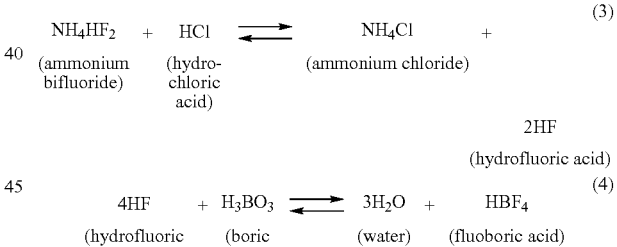

As shown by the reverse arrows, and as will be understood by those skilled in the art, the reactions will reach equilibrium, so that, for example, as shown by equation (4), a small concentration of HF will be present in the aqueous mixture. In the second reaction shown, citric acid, while also used herein as a chelating agent for aluminum and aluminum fluoride species, provides the hydrogen ions for the production of HF.

As will be appreciated by those skilled in the art, and with reference to equations 2 through 4, the blending of, in aqueous liquid or solution, at or by achievement of appropriate pH, a fluoride ion source, a boron source, and an acid, or mixture of acids, which chelate aluminum ions and aluminum fluoride species, or an ammonium or potassium salt or salts of such acids, or a mixture thereof, will produce the fluoborate anion (fluoboric acid) in the aqueous liquid. Additionally, HCl, a fluoride ion source, a boron source, and an acid, or mixture of acids, which chelate aluminum ions and aluminum fluoride species, or an ammonium or potassium salt or salts of such acids, or a mixture thereof, will also produce the fluoborate anion (fluoboric acid) in the aqueous liquid. Similarly, HF and a boron source will also produce the fluoborate anion (fluoboric acid) in the aqueous liquid. Accordingly, the various embodiments of the invention are linked in that all require an aqueous acidic liquid containing or comprising fluoborate anion (fluoboric acid), no matter how supplied, and also formed with an acid, or mixture of acids, which chelate aluminum ions and aluminum fluoride species, or an ammonium or potassium salt or salts of such acids, or a mixture thereof.

Within the limits of practical operation, the concentration of the fluoborate anion (fluoboric acid) in the aqueous liquid is not critical. In the embodiments of the invention wherein the $BF_4^-$ anion (fluoboric acid) is prepared or formed in the aqueous liquid, the concentrations of the components or reactants blended in the aqueous liquid will be apportioned in amounts effective to obtain or provide the desired concentration of the $BF_4^-$ anion (fluoboric acid) in the aqueous liquid. For example, wherein the fluoboric acid is formed by reaction of a fluoride ion source, such as ammonium bifluoride, a boron source, such as boric acid, and an acid, or mixture of acids, which chelate aluminum ions and aluminum fluoride species, or an ammonium or potassium salt or salts of such acids, or a mixture thereof, such as citric acid or N-(2-hydroxyethyl)ethylenediaminetriacetic acid, the fluoride ion source, the boron source, and an acid, or mixture of acids, which chelate aluminum ions and aluminum fluoride species, or an ammonium or potassium salt or salts of such acids, or a mixture thereof, are preferably, though not necessarily, blended in stoichiometric or approximately stoichiometric amounts or concentrations. In the aspect of the invention wherein HCl, a fluoride ion source, a boron source, and an acid, or mixture of acids, which chelate aluminum ions and aluminum fluoride species, or an ammonium or potassium salt or salts of such acids, or a mixture thereof, are provided or blended in aqueous liquid, the HCl and the fluoride ion source are preferably provided in approximately stoichiometric amounts, and an acid, or mixture of acids, which chelate aluminum ions and aluminum fluoride species, or an ammonium or potassium salt or salts of such acids, or a mixture thereof, may be provided in lesser amounts, if desired. Again, in the embodiment of the invention utilizing HF, the HF and boron source may be supplied in stoichiometric or approximately stoichiometric amounts, and the compound or compounds which chelate aluminum ion and aluminum fluoride species, need not be in such concentration. Accordingly, as will be understood by those skilled in the art, the ratios and concentrations of the components or reactants may be varied extensively, so long as the aqueous liquid contains an amount or concentration of the $BF_4^-$ anion (fluoboric acid), which, when supplied in sufficient volume or amount in or to the subterranean formation, is effective to increase the permeability of a subterranean formation. Generally, the concentrations of fluoboric acid blended with or formed in the aqueous liquid employed are those effective to achieve an observable improvement in stabilization of the clays and fines in the remote areas of the formation. Such a stabilizing effect can be recognized by improved production over a more prolonged period of time than would have been predicted based on previous experience in that field, or, for example, by laboratory techniques such as core flow tests or by examination of a formation sample using a scanning electron microscope as discussed in Society of Petroleum Engineers Paper No. 6007. Preferably, treatment compositions, once the starting ingredients have been mixed and dissolved in aqueous liquid or water, which contain from about 1 weight percent or less up to about 20 weight percent $BF_4^-$, basis $HBF_4$, may be employed. More preferably, the treatment composition comprises from about 2 to about 10 weight percent $BF_4^-$, basis $HBF_4$. Unless otherwise specified, or evident from context, all component percentages expressed hereinafter are by weight, based on the total weight of the component and the rest of the mixture.

In the embodiment wherein HF and a boron source are used to form fluoboric acid in the aqueous liquid, the relative concentrations or ratios of boron source, e.g., boric acid, and hydrofluoric acid used in preparing the mixture can be adjusted to tie up all of the free hydrofluoric acid (e.g. as the reaction product of fluoboric acid) or to leave some excess hydrofluoric acid (e.g. unreacted with the boron source). By adjusting the relative amounts of hydrofluoric acid to boron source in the mixture, fine tuning of the amount of free hydrofluoric acid in the composition of the invention may be achieved. Where excess HF is present, the amount of excess HF will preferably be less than about 1 percent.

In general, the components used in formulating the compositions of the invention are known and may be obtained from commercial chemical sources, or they may be prepared by well known procedures. For example, fluoboric acid, HF, HCl, various fluoride ion sources, such as ammonium bifluoride, various acids or ammonium or potassium salts which chelate aluminum or aluminum fluoride species, such as citric acid and N-(2-hydroxyethyl)ethylenediaminetriacetic acid, and various boron sources, such as boric acid, may be obtained readily. Commercial grade components may be utilized, of standard strengths available, so long as any extraneous species present therewith do not interfere significantly with the formulation of or function of the compositions of the invention. As used herein, the expression "aluminum fluoride species" refers to aluminum and fluorine-containing anions formed by reactions of one or more components of the aqueous liquid with components of the subterranean formation. Assuming that the principal reaction is, as conventionally understood, with HF from the fluoboric acid in the aqueous fluid, the reaction equation is shown, as follows:

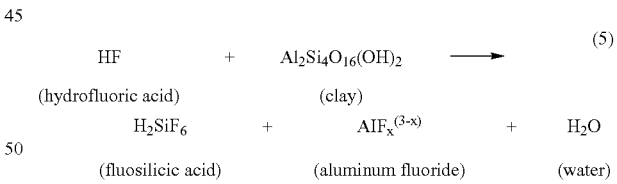

wherein x is a number from 1 to 6.

Actually, this is believed to be only the initial stage of a complex reaction sequence. Depending on the free fluoride concentration, aluminum fluorides are believed present as $Al^{3+}$, $AlF^{2+}$, $AlF_2^+$, $AlF_3$, $AlF_4^-$, $AlF_5^{2-}$, and $AlF6_3^-$. Silicon fluorides may exist as $SiF_4$, $SiF_5^{1-}$, and $SiF_6^{2-}$.

The silicon fluorides and more-fluoride-rich aluminum species are believed to react with additional clay, extracting aluminum and perhaps precipitating hydrated silica. For example, fluosilicic acid may react with additional clay to yield a hydrated silica, i.e., silica gel, a soluble aluminum fluoride species and other byproducts as follows:

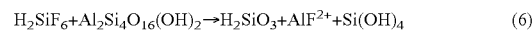

The reaction of equation (5) is referred to as the primary reaction and the reaction of equation (6) as the secondary reaction. Silica precipitation may occur according to equation (6).

Importantly, several embodiments of the invention composition further include an effective amount of an acid, or mixture of acids, which chelate aluminum ions and aluminum fluoride species, or an ammonium or potassium salt or salts of such acids, or a mixture thereof. As also indicated, in the case where HF is employed in formulating the invention composition, a greater variety of sequestering compounds may be employed. While not wishing to be bound by any theory of invention, it is believed that the sequestering of the aluminum and/or aluminum fluoride species by the acid(s), or ammonium or potassium salt(s) thereof, or sequestering compound or compounds, frees fluoride ions to associate in solution with Si ions and maintain the solubility thereof.

When the formation-dissolving agent is a strong acid, the fluid preferably contains a corrosion inhibitor. The fluid may optionally contain chelating agents for polyvalent cations, for example especially aluminum, calcium and iron (in which case the agents are often called iron sequestering agents) to prevent their precipitation. Some of the formation-dissolving agents just described are such chelating agents as well.

Fluids used in methods of the invention contain a viscosifier in an amount to impart suitable viscosity properties into the fluid. Any suitable viscosifier readily known to those of skill in the art for its ability to generate adequate viscosity properties for the treatment operation may be used. Such viscosifiers include, but are not necessarily limited to, surfactants, such as viscoelastic surfactants, a polysaccharide or chemically modified polysaccharide, polymers such as cellulose, derivatized cellulose, guar gum, derivatized guar gum, xanthan gum, or synthetic polymers such as polyacrylamides and polyacrylamide copolymers. Useful are ionically modified polysaccharides which are regularly substituted, such as those described in U.S. patent application Ser. No. 11/366,677, incorporated herein by reference thereto.

Some fluid systems used in some embodiments of the invention are those made from solutions of certain viscoelastic surfactants, in particular certain betaines, optionally in conjunction with co-surfactants or lower alcohols. Examples are described in U.S. Pat. No. 6,399,546, U.S. patent application Ser. Nos. 10/054,161, and 10/065,144, all of which have a common assignee as the present application, and all of which are hereby incorporated in their entirety.

We have found that certain viscoelastic surfactant fluid systems may be used at initial surfactant concentrations providing with much higher viscosity than would previously have been thought possible for sandstone acidizing fluids, particularly single acidizing fluids. In matrix treatments, for example, this initial fluid system forms wormholes and then gels at or near the tip of the wormhole, causing diversion. In acid fracturing, for example, this initial fluid gels where leakoff is high, and so this fluid system may help control leakoff.

Many cationic viscoelastic surfactants may be used to viscosify fluids used according to the invention, but certain cationic surfactants are preferred. Exemplary cationic viscoelastic surfactants include the amine salts and quaternary amine salts disclosed in U.S. Pat. Nos. 5,979,557, and 6,435,277 which have a common Assignee as the present application and which are hereby incorporated by reference.

Examples of suitable cationic viscoelastic surfactants include cationic surfactants having the structure:

$$R_1N^+(R_2)(R_3)(R_4)X^-$$

in which $R_1$ has from about 14 to about 26 carbon atoms and may be branched or straight chained, aromatic, saturated or unsaturated, and may contain a carbonyl, an amide, a retroamide, an imide, a urea, or an amine; $R_2$, $R_3$, and $R_4$ are each independently hydrogen or a C1 to about C6 aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; and $X^-$ is an anion. Mixtures of such compounds are also suitable. As a further example, $R_1$ is from about 18 to about 22 carbon atoms and may contain a carbonyl, an amide, or an amine, and $R_2$, $R_3$, and $R_4$ are the same as one another and contain from 1 to about 3 carbon atoms.

Cationic surfactants having the structure $R_1N^+(R_2)(R_3)(R_4)X^-$ may optionally contain amines having the structure $R_1N(R_2)(R_3)$. It is well known that commercially available cationic quaternary amine surfactants often contain the corresponding amines (in which $R_1$, $R_2$, and $R_3$ in the cationic surfactant and in the amine have the same structure). As received commercially available viscoelastic surfactant (VES) concentrate formulations, for example cationic viscoelastic surfactant formulations, may also optionally contain one or more members of the group consisting of solvents, mutual solvents, organic acids, organic acid salts, inorganic salts, and oligomers, polymers, co-polymers, and mixtures of these members. They may also contain performance enhancers, such as viscosity enhancers, for example polysulfonates, for example polysulfonic acids, as described in copending U.S. Patent Application Publication No. 2003-0134751 which has a common Assignee as the present application and which is hereby incorporated by reference.

Another suitable cationic viscoelastic surfactant is erucyl bis(2-hydroxyethyl) methyl ammonium chloride, ("EMHAC"), also known as (Z)-13 docosenyl-N—N— bis(2-hydroxyethyl) methyl ammonium chloride. It is commonly obtained from manufacturers as a mixture containing about 60 weight percent surfactant in a mixture of isopropanol, ethylene glycol and water. In this patent, when we refer to "EMHAC" we mean such a solution. Other suitable amine salts and quaternary amine salts include (either alone or in combination in accordance with the invention), erucyl trimethyl ammonium chloride; N-methyl-N,N-bis(2-hydroxyethyl) rapeseed ammonium chloride; oleyl methyl bis(hydroxyethyl) ammonium chloride; erucylamidopropyltrimethylamine chloride, octadecyl methyl bis(hydroxyethyl) ammonium bromide; octadecyl tris(hydroxyethyl) ammonium bromide; octadecyl dimethyl hydroxyethyl ammonium bromide; cetyl dimethyl hydroxyethyl ammonium bromide; cetyl methyl bis(hydroxyethyl) ammonium salicylate; cetyl methyl bis(hydroxyethyl) ammonium 3,4,-dichlorobenzoate; cetyl tris(hydroxyethyl) ammonium iodide; cosyl dimethyl hydroxyethyl ammonium bromide; cosyl methyl bis(hydroxyethyl) ammonium chloride; cosyl tris(hydroxyethyl) ammonium bromide; dicosyl dimethyl hydroxyethyl ammonium bromide; dicosyl methyl bis(hydroxyethyl) ammonium chloride; dicosyl tris(hydroxyethyl) ammonium bromide; hexadecyl ethyl bis(hydroxyethyl) ammonium chloride; hexadecyl isopropyl bis (hydroxyethyl) ammonium iodide; and cetylamino, N-octadecyl pyridinium chloride.

Zwitterionic viscoelastic surfactants are also suitable. Exemplary zwitterionic viscoelastic surfactants include those described in U.S. Pat. No. 6,703,352 which has a common Assignee as the present application and which is hereby incorporated by reference. Exemplary zwitterionic surfactants have the structure:

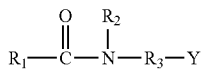

in which $R_1$ is a hydrocarbyl group that may be branched or straight chained, aromatic, aliphatic or olefinic and contains from about 14 to about 26 carbon atoms and may include an amine; $R_2$ is hydrogen or an alkyl group having from 1 to about 4 carbon atoms; $R_3$ is a hydrocarbyl group having from 1 to about 5 carbon atoms; and Y is an electron withdrawing group. More particularly, the zwitterionic surfactant may have the betaine structure:

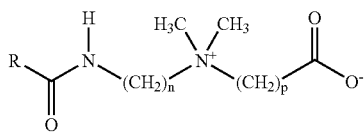

in which R is a hydrocarbyl group that may be branched or straight chained, aromatic, aliphatic or olefinic and has from about 14 to about 26 carbon atoms and may contain an amine; n=about 2 to about 4; and p=1 to about 5. Mixtures of these compounds may also be used.

Two examples of suitable betaines are, respectively, BET-O-30 and BET-E-40. The viscoelastic surfactant in BET-O-30 is oleylamidopropyl betaine. It is designated BET-O-30 here, because as obtained from the supplier (Rhodia, Inc. Cranbury, N.J., U.S.A.) it is called Mirataine BET-O-30; it contains an oleyl acid amide group (including a C17H33 alkene tail group) and is supplied as about 30% active surfactant; the remainder is substantially water, sodium chloride, glycerol and propane-1,2-diol. An analogous suitable material, BET-E-40, was used in the experiments described below; one chemical name is erucylamidopropyl betaine. BET-E-40 is also available from Rhodia; it contains a erucic acid amide group (including a C21H41 alkene tail group) and is supplied as about 40% active ingredient, with the remainder substantially water, sodium chloride, and isopropanol. BET surfactants, and others that are suitable, are described in U.S. Pat. No. 6,703,352.

Certain co-surfactants may be useful in extending the brine tolerance, to increase the gel strength, to reduce the shear rehealing time, and/or to reduce the shear sensitivity of zwitterionic viscoelastic surfactant based fluid systems, such as betaine viscoelastic surfactant fluids. An example given in U.S. Pat. No. 6,703,352 is sodium dodecylbenzene sulfonate (SDBS). Another example is polynaphthalene sulfonate. Zwitterionic viscoelastic surfactant's may be used with or without this type of co-surfactant, for example those having a SDBS-like structure having a saturated or unsaturated, branched or straight-chained C6 to C16 chain; further examples of this type of co-surfactant are those having a saturated or unsaturated, branched or straight-chained C8 to C16 chain. Other suitable examples of this type of co-surfactant, especially for BET-O-30, are certain chelating agents such as trisodium hydroxyethylethylenediamine triacetate. Many suitable additives are known for improving the performance of gelled viscoelastic surfactant systems; any may be used in the current invention; they should be tested for compatibility with the compositions and methods of the invention before use; simple laboratory experiments for such testing are well known.

The aqueous medium of fluids useful of the invention may be water or brine. Where the aqueous medium is a brine, the brine is water comprising an inorganic salt(s), organic salt(s), or mixture(s) thereof. Preferred inorganic salts include alkali metal halides, more preferably potassium chloride. The carrier brine phase may also comprise an organic salt more preferably sodium or potassium formate. Preferred inorganic divalent salts include calcium halides, more preferably calcium chloride or calcium bromide. Sodium bromide, potassium bromide, or cesium bromide may also be used. The salt is chosen for compatibility reasons i.e. where the reservoir drilling fluid used a particular brine phase and the completion/clean up fluid brine phase is chosen to have the same brine phase.

Conventional propped hydraulic fracturing methods, with appropriate adjustments if necessary, as will be apparent to those skilled in the art, are used in the methods of the invention. One preferred fracture stimulation treatment according to the present invention typically begins with a conventional pad stage to generate the fracture, followed by a sequence of stages in which a viscous carrier fluid transports proppant into the fracture as the fracture is propagated. Typically, in this sequence of stages the amount of propping agent is increased, normally stepwise. The pad and carrier fluid can be, and usually are, a gelled aqueous fluid, such as water or brine thickened with a viscoelastic surfactant or with a water soluble or dispersible polymer such as guar, hydroxypropylguar or the like. The pad and carrier fluids may contain various additives. Non-limiting examples are fluid loss additives, crosslinking agents, clay control agents, and mobility control agents such as fibers, breakers and the like, provided that the additives do not affect the stability or action of the formation-dissolving fluid.

The procedural techniques for pumping fracture stimulation fluids down a wellbore to fracture a subterranean formation are well known. The person that designs such fracturing treatments is the person of ordinary skill to whom this disclosure is directed. That person has available many useful tools to help design and implement the fracturing treatments, one of which is a computer program commonly referred to as a fracture simulation model (also known as fracture models, fracture simulators, and fracture placement models). Most if not all commercial service companies that provide fracturing services to the oilfield have one or more fracture simulation models that their treatment designers use. One commercial fracture simulation model that is widely used by several service companies is known as FracCADE™. This commercial computer program is a fracture design, prediction, and treatment-monitoring program designed by Schlumberger, Ltd. All of the various fracture simulation models use information available to the treatment designer concerning the formation to be treated and the various treatment fluids (and additives) in the calculations, and the program output is a pumping schedule that is used to pump the fracture stimulation fluids into the wellbore. The text "Reservoir Stimulation," Third Edition, Edited by Michael J. Economides and Kenneth G. Nolte, Published by John Wiley & Sons, (2000), is an excellent reference book for fracturing and other well treatments; it discusses fracture simulation models in Chapter 5 (page 5-28) and the Appendix for Chapter 5 (page A-15)), which are incorporated herein by reference.

In some embodiments, because the fracture area available for inflow of fluids into the wellbore is increased by acidization of fracture facets, it is not necessary to generate a long fracture in the formation. In that case, to save fluids, hydraulic horsepower, time and money, a tip screenout may be desirable. In a tip screenout, the solids concentration at the tip of the fracture becomes so high due to fluid leak-off into the formation that the slurry is no longer mobile. The concentrated proppant slurry plugs the fracture, preventing additional growth of the fracture length. Additional pumping of the proppant/fluid slurry into the formation after the screenout occurs causes the fracture to balloon. The fracture grows in width rather than length, and large concentrations of proppant per surface area are placed in the fracture. Jobs may be deliberately designed to increase the probability of tip screenouts, and additional steps may be taken to induce tip screenouts, for example by the methods described in U.S. patent application Ser. Nos. 10/214,817 and 10/227,690 both of which have a common assignee as the present application.

Many of the formation-dissolving fluids of the invention, such as acids, would have an added advantage of being breakers for polymers, or for some of the surfactants and/or the micelles in viscoelastic surfactants. Another advantage to the method is that it would allow the operator to push live formation-dissolving fluid out further and more quickly because some of the volume of the fracture would already be taken up by proppant. Another advantage is that the operator may be able to pump into a propped fracture at much lower pressures, which would be an economic advantage.

To illustrate the function of some methods of the invention, first, an initial viscous formation dissolving fluid is pumped into a wellbore to create the initial fracture geometry, followed by additional stage(s) of viscous formation dissolving fluid. Each is injected at pressures and rates sufficient to generate and propagate a fracture. The viscosified formation-dissolving fluid is by non-limiting example a viscoelastic surfactant-based micellar system containing an acid or a chelating agent or both. The viscosity of such a system depends upon such factors as the surfactant concentration, the environment (such as the pH and the nature and concentration of salts), the time, the temperature, and the presence of other components such as alcohols, co-surfactants and breakers. The reactivity of such a system depends upon some of the same factors as well as on the nature and concentration of the formation-dissolving component. The nature of these dependencies are known, and thus the relative rates at which this carrier fluid loses viscosity, leaks off through the faces of the fracture and reacts with the formation are adjusted, taking into account the flow rate necessary to maintain the needed pressure to maintain the hydraulic fracture open. The viscous formation dissolving fluid leaking off through the faces of the fracture dissolves acid soluble minerals and damage present in the formation matrix, increasing the permeability and porosity, such that when the pumping is stopped and the fracture closes there remains a highly permeable channel in the formation.

In another embodiment, the initial fluid pumped to create the initial fracture geometry is a viscous formation dissolving fluid followed by a proppant-transporting carrier fluid in the later stages. The proppant-transporting carrier fluid being a conventional polymer-viscosified aqueous fluid. Each is injected at pressures and rates sufficient to generate and propagate fractures. By non-limiting example the viscous formation dissolving fluid in the initial stage may be a viscoelastic surfactant-based micellar system containing an acid, or a chelating agent, or both acid and chelating agent. The viscosity of such a system depends upon such factors as the surfactant concentration, the environment (such as the pH and the nature and concentration of salts), the time, the temperature, and the presence of other components such as alcohols, co-surfactants and breakers. The reactivity of such a system depends upon some of the same factors as well as on the nature and concentration of the formation-dissolving component. The nature of these dependencies are known, and thus the relative rates at which this carrier fluid loses viscosity, leakoff into the faces of the fracture and reacts with the formation are adjusted, and taking into account the flow rate necessary to maintain the needed pressure to maintain the hydraulic fracture open. The purpose of the viscous dissolving fluid is to dissolve acid soluble or potentially damaging minerals, such as clays, minerals in the faces of fracture effectively increasing the permeability of the formation matrix which in turn eliminates any fracture face skin effects which could limit the productivity, flow capacity, of the final propped fracture. By non-limiting example, the carrier fluid in the later proppant-transporting stages is viscosified with guar or a substituted guar containing a breaker such as an oxidizing agent and/or enzyme. A fluid that does not dissolve the formation is used in these proppant laden carrier stages to ensure efficient transport of the proppant into and along the fracture without the problems that would be encountered if the formation dissolving fluid were to react with the formation near the wellbore, resulting in excessive fluid loss and the possibility of the hydraulic fracture closing.

In yet another embodiment of the invention, a propped fracture is created with a viscous, formation-dissolving carrier fluid that has sufficient viscosity and leak-off control to create a propped fracture of the desired dimensions. The conditions can be adjusted so that leak off of some of the viscous, formation-dissolving carrier fluid will dissolve acid soluble or potentially damaging minerals, such as clays, minerals in the faces of fracture effectively increasing the permeability of the formation matrix which in turn eliminates any fracture face skin effects which could limit the productivity, flow capacity, of the final propped fracture. Optionally, the method may be designed so that a tip screenout occurs. This embodiment also has the advantage that all fluids pumped are capable of dissolving the formation, eliminating any possibility of inert fluids damaging the formation, either through chemical or physical interaction. The viscosified formation-dissolving fluid is by non-limiting example a viscoelastic surfactant-based micellar system containing an acid or a chelating agent or both. The viscosity of such a system depends upon such factors as the surfactant concentration, the environment (such as the pH and the nature and concentration of salts), the time, the temperature, and the presence of other components such as alcohols, co-surfactants and breakers. In this example the use of a viscoelastic surfactant-based micellar system eliminates the possibility of polymer leaking off and plugging the faces of the fractures.

To illustrate another embodiment, a viscous formation dissolving fluid is pumped in a single stage to create a hydraulic fracture with the geometry of a planned propped fracture. After this step the pumps are stopped and the fracture is allowed to close. At a later time, varying from hours to days, a propped fracture is created. The carrier fluid in the proppant-transporting stages being either a conventional polymer-viscosified aqueous fluid or a viscoelastic surfactant-based micellar fluid. Each is injected at pressures and rates sufficient to generate and propagate fractures. This method may be deployed when, as non-limiting examples, it is known that it is not possible to maintain the needed pressure and to transport proppant, using a viscosified formation-dissolving carrier fluid or for reasons of economics or logistics it is required to minimize the volume of viscous formation-dissolving fluid used.

All of the fluids injected in the methods of the invention, such as the pad, the viscous proppant-carrying fluid and the formation-dissolving fluid, may contain various additives well known in stimulation treatments (such as, for example, corrosion inhibitors, iron control agents, surfactants, clay control additives, buffers, scale inhibitors and the like) provided that the additives do not interfere with the desired action or stability of the fluid. It would be expected, and within the scope of the invention, to conduct laboratory tests or run computer simulations to ensure that such additives were suitable.

In one embodiment, the fluid contains a material to control or eliminate fines (such as clay fines) migration to avoid possible plugging of the formation matrix or even plugging of the proppant pack itself. Such materials shall be readily known to those of skill in the art, and may included materials as, but not necessarily limited to zirconium oxychlorides, those materials described in U.S. Pat. No. 3,382,924, hereinafter incorporated by reference thereto, flouboric acid, and the like.

A fiber component may be included in the fluids useful in the invention to achieve a variety of properties including improving particle suspension, and particle transport capabilities, and gas phase stability. Fibers used may be hydrophilic or hydrophobic in nature, but hydrophilic fibers are preferred. Fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) Fibers available from Invista Corp. Wichita, Kans., USA, 67220. Other examples of useful fibers include, but are not limited to, polylactic acid polyester fibers, polyglycolic acid polyester fibers, polyvinyl alcohol fibers, and the like. When used in fluids of the invention, the fiber component may be include at concentrations from about 1 to about 15 grams per liter of the liquid phase of the fluid, preferably the concentration of fibers are from about 2 to about 12 grams per liter of liquid, and more preferably from about 2 to about 10 grams per liter of liquid.

Embodiments of the invention may also include placing proppant particles that are substantially insoluble in the fluids of the formation. Proppant particles carried by the treatment fluid remain in the fracture created, thus propping open the fracture when the fracturing pressure is released and the well is put into production. Suitable proppant materials include, but are not limited to, sand, walnut shells, sintered bauxite, glass beads, ceramic materials, naturally occurring materials, or similar materials. Mixtures of proppants can be used as well. If sand is used, it will typically be from about 20 to about 100 U.S. Standard Mesh in size. Naturally occurring materials may be underived and/or unprocessed naturally occurring materials, as well as materials based on naturally occurring materials that have been processed and/or derived. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc. including such woods that have been processed by grinding, chipping, or other form of particalization, processing, etc. Further information on nuts and composition thereof may be found in Encyclopedia of Chemical Technology, Edited by Raymond E. Kirk and Donald F. Othmer, Third Edition, John Wiley & Sons, Volume 16, pages 248-273 (entitled "Nuts"), Copyright 1981, which is incorporated herein by reference.

The concentration of proppant in the fluid can be any concentration known in the art, and will preferably be in the range of from about 0.05 to about 3 kilograms of proppant added per liter of liquid phase. Also, any of the proppant particles can further be coated with a resin to potentially improve the strength, clustering ability, and flow back properties of the proppant.

The following examples are presented to illustrate methods of using viscosified formation dissolving fluids to create acidized sandstone fractures, and should not be construed to limit the scope of the invention, unless otherwise expressly indicated in the appended claims. All percentages, concentrations, ratios, parts, etc. are by weight unless otherwise noted or apparent from the context of their use.

EXAMPLES

The following examples illustrate some methods of the present invention, as described in the detailed description.

Example 1

The following steps were conducted to determine the change in permeability due to the injection of viscous dissolving fluid, thus illustrating carrying out one embodiment of the invention. In a first step, core flow testing was conducted as follows:

a. Vacuum saturate a core in test brine (5% KCl or $NH_4Cl$).
b. Load the core into the core flow apparatus and apply the overburden pressure of about 2,000 psi.
c. Heat the cell to operating temperature and apply backpressure of about 500 psi.
d. Measure initial, stable permeability with 5% KCl or $NH_4Cl$ at 5 ml/min in production direction.
e. Measure final permeability with 5% KCl or $NH_4Cl$ in production direction
f. Measure initial, stable permeability with 5% KCl or $NH_4Cl$ at 5 ml/min in injection direction
g. Measure final permeability with 5% KCl or $NH_4Cl$ in injection direction
h. Inject the viscosified dissolving agent at 1 ml/min in injection direction up to 18 pore volumes of fluid.
i. Measure final, stable permeability with 5% KCl or NH4Cl 5 ml/min in the injection direction.
j. Measure initial, stable permeability with 5% KCl or NH4Cl 5 ml/min in the production direction.

In Step 2, the optimum viscosity of the viscous dissolving fluid was determined to ensure adequate penetration of the treating fluid into the faces of the fractures, which would result in an $C_{fD}>0.3$. This is done using the methodology outlined in the paper SPE 73759, "Effect of Fracture Face Damage on Well Productivity", K. Adegbola & C. Boney, SPE International Symposium and Exhibition on Formation Damage Control, Lafayette, La., 20-21 Feb. 2002 (see pages 1-2).

For step 3, a fracture simulator, FracCADE*, was used to determine the volume of viscous dissolving fluid, with the properties determined in step 2 above $C_t$ (Total leak-off coefficient, usually the combined effect of Cv, Cc and Cw, ft/min0.5 [m/s0.5]) viscosity and in turn fluid efficiency required generating a hydraulic fracture with the required geometry in the zone of interest.

At step 4, a volume of treatment fluid was prepared for laboratory confirmation as follows:
  a. Preparing first the required volume of viscous dissolving fluid and chelant,
  b. Adding the required volume of viscosifier to provide the final viscosity required from step 2, and
  c. Confirming the properties of the fluid by laboratory testing.

The fluid contained 20% by weight diammonium ethylenediaminetetraacetate ("DAE" in this example), 1% by weight ammonium bifluoride (also referred to as ABF) as the primary formation-dissolution agent, 0.5% by weight of a corrosion inhibitor for organic acids, and 6% by weight MIRATAINE BET O-30 viscosifier available from Rhodia, Inc. Cranbury, N.J., U.S.A. The balance of the composition was water. As shown in Table 1, using a Fann 35 viscometer, equipped with rotor R1, bob B1, and spring F1, fluid viscosity properties were measured at room temperature (about 72° F.) and about 164° F.

TABLE 1

| Temperature (° F.) | Shear Rate (s$^{-1}$) | Viscosity (mPa-s) |
|---|---|---|
| 72° | 511 | 46 |
| 72° | 341 | 37 |
| 72° | 170 | 90 |
| 164° | 511 | 60 |
| 164° | 341 | 72 |
| 164° | 170 | 105 |

For step 5 the viscosified dissolving fluid are pumped into the wellbore and so into the formation of interest at a pressure that exceeds the fracture initiation pressure of the formation. At step 6, once the required volume of viscous dissolving fluid has been injected into the formation, the pumps are shut down and the hydraulic fracture allowed close. In step 7, the hydraulic fracture has closed (BHP fallen below closure pressure) the well is produced to flow back the spent treating fluids.

The fluid described in this example, as tested in step 1 above for stable permeability in the production direction yielded a value of 43.4% at 180° F.

Example 2

In another example of carrying out the invention, the same steps above are followed. But, the fluid composition contains an 7.5% by weight of mixture inorganic acids (6:1.5 HCl:HF), 6% by weight of MIRATAINE BET-E-40 available from Rhodia, and 0.3% by weight of a corrosion inhibitor. The balance of the composition was water. As shown in Table 2, using a Fann 35 viscometer, equipped with rotor R1, bob B1, and spring F1, fluid viscosity properties were measured at room temperature (about 72° F.) and about 158° F.

TABLE 2

| Temperature (° F.) | Shear Rate (s$^{-1}$) | Viscosity (mPa-s) |
|---|---|---|
| 72° | 511 | 87 |
| 72° | 341 | 104 |
| 72° | 170 | 99 |
| 158° | 511 | 44 |
| 158° | 341 | 59 |
| 158° | 170 | 111 |

Although the methods have been described here for, and are most typically used for, hydrocarbon production, they may be used in injection wells and for production of other fluids, such as water or brine. The particular embodiments disclosed above are illustrative only, as the invention may be modified and practiced in different but equivalent manners apparent to those skilled in the art having the benefit of the teachings herein. Furthermore, no limitations are intended to the details herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method of stimulating a sandstone subterranean formation comprising:
  a. preparing an aqueous viscous dissolving fluid comprising:
    i. viscosifier incorporated in an amount suitable to provide measured fluid viscosity from about 20 mPa-s to about 400 mPa-s at a shear rate of 100 s$^{-1}$ over a temperature range from about 80° F. to about 300° F.;
    ii. at least one formation dissolving agent; and,
    iii. a chelant selected from the group consisting of aminopolycarboxylic acid, and aminopolycarboxylic acid salt;
  b. injecting the viscosified fluid into a wellbore penetrating the formation at a pressure that exceeds the fracture initiation pressure of the formation;
  c. relieving the initiation pressure and allowing a hydraulic fracture to at least partially close; and
  d. flowing back the wellbore to produce a substantial amount of the viscosified fluid.

2. The method of claim 1 further comprising adding a proppant to the fluid wherein the proppant is placed in the fracture.

3. The method of claim 2 further comprising adding a proppant to the fluid wherein the proppant is placed in the fracture simultaneous with fracturing and acidizing the formation.

4. The method of claim 3 wherein the viscosified fluid further comprises a breaker.

5. The method of claim 2 wherein a tip screenout is induced in said step of injecting a viscous carrier fluid containing proppant at a rate and pressure sufficient to fracture said formation.

6. The method of claim 1 wherein the fluid comprises about 0.1% to 6% by weight of fluoride generating compound, provided the fluoride source is not generated by adding hydrofluoric acid to the fluid.

7. The method of claim 1 wherein the viscosified fluid pH is about 5 or less.

8. The method of claim 1 wherein the measured fluid viscosity is from about 40 mPa-s to about 400 mPa-s at a shear rate of 100 s$^{-1}$ over a temperature range from about 80° F. to about 300° F.

9. The method of claim 1 wherein the dissolving agent comprises a chelant.

10. The method of claim 1 wherein the formation dissolving agent comprises a component selected from the group consisting of hydrofluoric acid and a hydrofluoric acid precursor.

11. The method of claim 1 wherein the viscosifier is a viscoelastic surfactant.

12. The method of claim 11 wherein the viscoelastic surfactant is a betaine.

13. The method of claim 11 wherein the concentration of the viscoelastic surfactant is between about 0.1% and about 10% by weight based upon total fluid weight.

14. The method of claim 13 wherein the concentration of the viscoelastic surfactant is between about 0.2% and about 2% by weight based upon total fluid weight.

15. The method of claim 1 further comprising injecting a second portion of the viscosified fluid into a wellbore penetrating the formation a sand at a pressure that exceeds the fracture initiation pressure of the formation, prior to relieving the initiation pressure and allowing a hydraulic fracture to at least partially close.

16. The method of claim 1 further comprising injecting a proppant-transporting carrier fluid into the wellbore, the proppant-transporting carrier fluid comprising a viscosifier and a proppant, wherein the proppant-transporting carrier fluid is injected at a pressure that exceeds the fracture initiation pressure of the formation.

17. The method of claim 1 wherein the fluid further comprises a material effective precursor to eliminate fines migration.

18. A method of stimulating a sandstone subterranean formation comprising:
   a. preparing an aqueous viscous dissolving fluid comprising:
      i. viscoelastic surfactant based viscosifier incorporated in an amount suitable to provide measured fluid viscosity from about 40 mPa-s to about 400 mPa-s at a shear rate of 100 s$^{-1}$ over a temperature range from about 80° F. to about 300° F.;
      ii. at least one formation dissolving agent; and,
      iii. a chelant selected from the group consisting of aminopolycarboxylic acid, and aminopolycarboxylic acid salt;
   b. injecting a first volume of the viscosified fluid into a wellbore penetrating the formation a sand at a pressure that exceeds the fracture initiation pressure of the formation;
   c. injecting at least one further volume of the viscosified fluid into a wellbore penetrating the formation a sand at a pressure that exceeds the fracture initiation pressure of the formation;
   d. relieving the initiation pressure and allowing a hydraulic fracture to at least partially close; and
   e. flowing back the wellbore to produce a substantial amount of the viscosified fluid.

19. The method of claim 18 where the at least one further volume of the viscosified fluid further comprises a proppant.

20. A method of stimulating a sandstone subterranean formation comprising:
   a. preparing an aqueous viscous dissolving fluid comprising:
      i. viscoelastic surfactant based viscosifier incorporated in an amount suitable to provide measured fluid viscosity from about 40 mPa-s to about 400 mPa-s at a shear rate of 100 s$^{-1}$ over a temperature range from about 80° F. to about 300° F.;
      ii. at least one formation dissolving agent; and,
      iii. a chelant selected from the group consisting of aminopolycarboxylic acid, and aminopolycarboxylic acid salt;
   b. injecting the viscosified fluid into a wellbore penetrating the formation a sand at a pressure that exceeds the fracture initiation pressure of the formation;
   c. injecting a proppant-transporting carrier fluid into the wellbore, the proppant-transporting carrier fluid comprising a polymer viscosifier and a proppant at a pressure that exceeds the fracture initiation pressure of the formation;
   d. relieving the initiation pressure and allowing a hydraulic fracture to at least partially close; and
   e. flowing back the wellbore to produce a substantial amount of the viscosified fluid.

\* \* \* \* \*